United States Patent
Ganiger et al.

(10) Patent No.: US 11,725,817 B2
(45) Date of Patent: Aug. 15, 2023

(54) COMBUSTOR ASSEMBLY WITH MOVEABLE INTERFACE DILUTION OPENING

(71) Applicant: General Electric Company, Schenectady, NY (US)

(72) Inventors: Ravindra Shankar Ganiger, Bangalore (IN); Hiranya Kumar Nath, Bangalore (IN); Rajendra Mahadeorao Wankhade, Bangalore (IN); Daniel J. Kirtley, Blue Ash, OH (US); Michael Anthony Benjamin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/363,088

(22) Filed: Jun. 30, 2021

(65) Prior Publication Data

US 2023/0003382 A1  Jan. 5, 2023

(51) Int. Cl.

| | |
|---|---|
| *F23R 3/08* | (2006.01) |
| *F23R 3/00* | (2006.01) |
| *F23R 3/06* | (2006.01) |
| *F01D 9/02* | (2006.01) |
| *F23R 3/60* | (2006.01) |
| *F02C 7/28* | (2006.01) |

(52) U.S. Cl.
CPC ............... *F23R 3/08* (2013.01); *F01D 9/023* (2013.01); *F23R 3/002* (2013.01); *F23R 3/06* (2013.01); *F23R 3/60* (2013.01); *F02C 7/28* (2013.01); *F05D 2220/32* (2013.01); *F05D 2240/35* (2013.01); *F05D 2240/55* (2013.01); *F23R 3/005* (2013.01)

(58) Field of Classification Search
CPC .... F23R 3/08; F23R 3/002; F23R 3/06; F23R 3/60; F23R 3/005; F01D 9/023; F02C 7/28; F05D 2220/32; F05D 2240/35; F05D 2240/55

See application file for complete search history.

(56) References Cited

U.S. PATENT DOCUMENTS

| | | | | |
|---|---|---|---|---|
| 3,965,066 A | * | 6/1976 | Sterman | ................. F01D 9/023 415/138 |
| 4,232,527 A | | 11/1980 | Reider | |
| 4,458,481 A | * | 7/1984 | Ernst | ......................... F23R 3/54 60/757 |
| 4,889,469 A | * | 12/1989 | Wilkinson | .............. F01D 9/042 415/137 |
| 5,407,319 A | * | 4/1995 | Harrogate | ............. F01D 11/005 415/115 |
| 5,417,545 A | * | 5/1995 | Harrogate | ............... F01D 5/186 60/757 |

(Continued)

*Primary Examiner* — Gerald L Sung
*Assistant Examiner* — Rene D Ford
(74) *Attorney, Agent, or Firm* — Dority & Manning, P.A.

(57) ABSTRACT

A gas turbine engine and combustor assembly are provided, the combustor assembly including a first liner and a second liner together defining at least in part a combustion chamber, wherein the first liner and the second liner are separated by a gap along the longitudinal direction, and wherein the first liner is forward of the second liner relative to a flow of fluid through the combustion chamber along the longitudinal direction, and wherein the gap is extended along the circumferential direction.

17 Claims, 13 Drawing Sheets

(56) References Cited

U.S. PATENT DOCUMENTS

| | | | |
|---|---|---|---|
| 5,987,879 A | 11/1999 | Ono | |
| 6,347,508 B1* | 2/2002 | Smallwood | F01D 11/005 |
| | | | 60/800 |
| 6,658,853 B2 | 12/2003 | Matsuda et al. | |
| 7,527,469 B2 | 5/2009 | Zborovsky et al. | |
| 8,276,391 B2* | 10/2012 | Berry | F01D 9/023 |
| | | | 60/758 |
| 8,491,259 B2 | 7/2013 | Sutcu | |
| 9,605,550 B2 | 3/2017 | Graves | |
| 10,677,465 B2 | 6/2020 | Venturato et al. | |
| 10,683,766 B2 | 6/2020 | Lang et al. | |
| 10,801,729 B2 | 10/2020 | Bloom | |
| 10,830,069 B2* | 11/2020 | Morgan | F01D 9/023 |
| 10,895,163 B2* | 1/2021 | Schiavo | F16J 15/0887 |
| 10,907,830 B2* | 2/2021 | Wilson | F23R 3/005 |
| 2010/0319349 A1* | 12/2010 | Rajaram | F02C 7/24 |
| | | | 60/725 |
| 2012/0180500 A1* | 7/2012 | DiCintio | F01D 9/023 |
| | | | 29/888 |
| 2013/0174558 A1* | 7/2013 | Stryapunin | F23R 3/34 |
| | | | 60/734 |
| 2016/0258624 A1* | 9/2016 | Harding | F23M 5/04 |
| 2017/0307221 A1* | 10/2017 | Hucker | F23R 3/50 |
| 2018/0036843 A1* | 2/2018 | Hucker | F23R 3/002 |
| 2020/0024993 A1* | 1/2020 | Kumar | F23R 3/50 |
| 2020/0025003 A1* | 1/2020 | Mulcaire | F01D 11/005 |
| 2020/0141586 A1 | 5/2020 | Igarashi et al. | |
| 2020/0271003 A1* | 8/2020 | McCormick | F02C 7/28 |

\* cited by examiner

COMBUSTOR ASSEMBLY WITH MOVEABLE INTERFACE DILUTION OPENING

FIELD

The present disclosure generally pertains to gas turbine engines, and, more specifically, to a combustor for a gas turbine engine.

BACKGROUND

Gas turbine engines generally include combustion sections configured to generate combustion gases from a receive a flow of compressed air mixed with fuel and ignited in a combustion chamber. This process generates heat and pressure changes that require flows of air to condition the combustion gases for a downstream turbine section, or to limit damage to the combustion section due to the generated heat.

Combustion sections are generally required to produce high-energy combustion gases while also limiting emissions such as oxides of nitrogen, greenhouse gases, unburned hydrocarbons, or smoke. Furthermore, combustion sections are challenged to introduce cooling air to limit damage or deterioration to structures at the combustion section and downstream turbine section. Generally, achieving some of these challenges requires or results in compromises toward achieving other challenges. Furthermore, it is recognized that changes in geometries at a combustion section often have unpredictable effects at the combustion section, such as with regard to limiting emissions, limiting deterioration, or limiting undesired pressure oscillations.

As such, there is a need for improved combustion section structures. Furthermore, there is a need for improved combustion gas dilution structures that limit deterioration of combustion section structures.

BRIEF DESCRIPTION

Aspects and advantages of the disclosure will be set forth in part in the following description, or may be obvious from the description, or may be learned through practice of the disclosure.

Aspects of the present disclosure are directed to a gas turbine engine and combustor assembly. The combustor assembly includes a first liner and a second liner together defining at least in part a combustion chamber. The first liner and the second liner are separated by a gap along the longitudinal direction. The first liner is forward of the second liner relative to a flow of fluid through the combustion chamber along the longitudinal direction. The gap is extended along the circumferential direction.

Another aspect of the present disclosure is directed to a gas turbine engine defining a longitudinal direction and a circumferential direction. The gas turbine engine includes a combustor assembly having a first liner and a second liner together defining at least in part a combustion chamber. The first liner and the second liner are separated by a gap along the longitudinal direction. The first liner is forward of the second liner relative to a flow of fluid through the combustion chamber along the longitudinal direction. The gap is extended along the circumferential direction. The combustor assembly includes a bulkhead assembly at an upstream end of the combustion chamber. The first liner is connected to the bulkhead assembly. A turbine nozzle is positioned at a downstream end of the combustion chamber, and the second liner is connected to the turbine nozzle.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the preferred embodiments, including the best mode thereof, directed to one of ordinary skill in the art, is set forth in the specification, which makes reference to the appended figures, in which.

Figure 1:
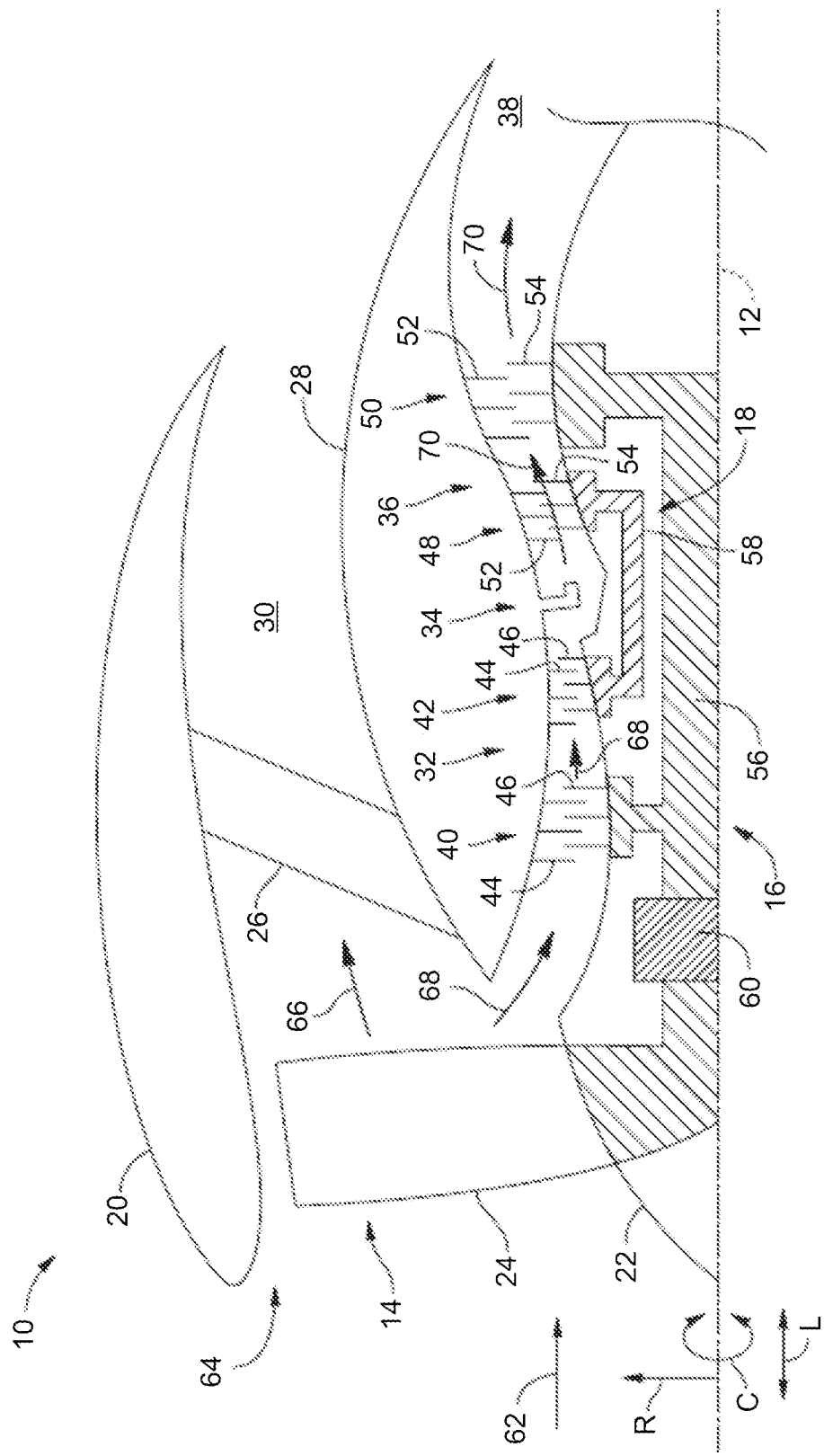
FIG. 1 is a schematic cross-sectional view of a gas turbine engine in accordance with an exemplary embodiment of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The terms "coupled," "fixed," "attached to," and the like refer to both direct coupling, fixing, or attaching, as well as indirect coupling, fixing, or attaching through one or more intermediate components or features, unless otherwise specified herein.

The present subject matter is directed to a combustor for a gas turbine engine. In general, the combustor can include a forward liner segment and an aft liner segment positioned downstream of the forward liner segment relative to a flow of fluid along a longitudinal direction toward an exhaust section. In this respect, the forward and aft liner segments at least partially define a combustion chamber in which a fuel and air mixture is burned to generate combustion gases.

A dilution slot or gap is formed by a longitudinal separation of the forward liner segment and the aft liner segment. The gap allows for up to a substantially 360 degree sheet of dilution fluid, such as compressed air, to enter the combustion chamber for rapid mixing with the combustion gases and improved completion of the combustion process in a lean zone. An annular wall or fence is extended radially into the combustion chamber from the aft liner segment, allowing for improved penetration of the compressed air into the combustion chamber.

In certain embodiments, the forward liner segment is connected to an upstream bulkhead assembly and the aft liner segment is connected to a downstream turbine nozzle. The forward liner segment may be cantilevered from the bulkhead assembly. The aft liner segment may be cantilevered from the turbine nozzle. The dilution slot or gap is formed between the cantilevered ends of the forward liner segment and the aft liner segment.

In a particular arrangement, a moveable interface is positioned between forward liner segment and the aft liner segment. The moveable interface may form a floating insert that regulates or controls a longitudinal dimension of the gap and accommodates the independent thermal expansion of the forward and aft liner segments.

Embodiments provided herein allow for reducing emissions, such as oxides of nitrogen ($NO_x$) in rich-burn combustor configurations. The dilution slot or gap formed by forward and aft liner segments, such as a substantially or fully annular gap, may substantially reduce gas temperatures along the walls of the liners by 500 degrees Fahrenheit or more. Additionally, or alternatively, embodiments provided herein may reduce a circumferential temperature gradient at and downstream of the combustion chamber (i.e., hot spots) and generally improve pattern factor, allowing for improved durability and reduced deterioration of the liners and downstream turbine section. The moveable interface may further allow for adjustment or controllability of the gap relative to changes in liner temperature and provide improved vibration response or dampening.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to a longitudinal centerline 12 of the engine 10, the radial direction R extends orthogonally outward from the longitudinal centerline 12, and the circumferential direction C extends generally concentrically around the longitudinal centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan 14 along the longitudinal centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the longitudinal centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the longitudinal centerline 12. Each turbine 48, 50 may, in turn, include one or more rows of stator vanes 52 interdigitated with one or more rows of turbine rotor blades 54. In a particular embodiment, the turbine section includes a first stator vane assembly or turbine nozzle 52 positioned downstream of a combustion chamber 106 and upstream of the turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air 62 enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
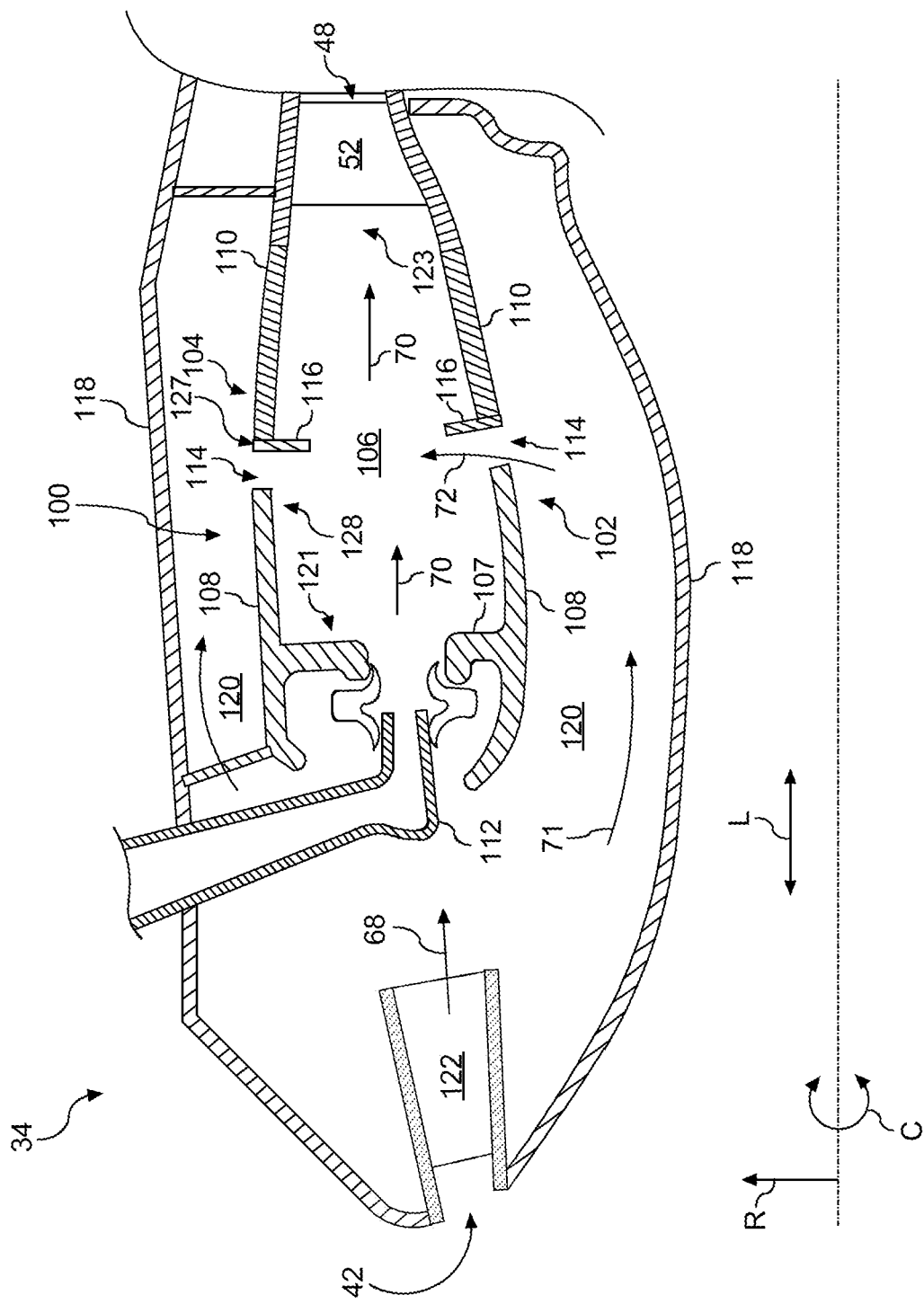
FIG. 2 is a cross-sectional side view of a combustion section of a gas turbine engine in accordance with an exemplary embodiment of the present disclosure.

FIG. 2 is a cross-sectional view of one embodiment of the combustion section 34 of the gas turbine engine 10. As shown, the combustion section 34 includes an annular combustor assembly 100. In several embodiments, the combustion section 34 includes a compressor discharge casing 118. In such embodiments, the compressor discharge casing 118 at least partially surrounds or otherwise encloses the combustor(s) 100 in the circumferential direction C. In this respect, a compressor discharge plenum 120 is defined between the compressor discharge casing 118 and liners 102, 104. The compressor discharge plenum 120 is, in turn, configured to supply compressed air to the combustor(s) 100. Specifically, as shown, the air 68 exiting the HP compressor 42 is directed into the compressor discharge plenum 120 by an inlet guide vane 122. The air 68 within the compressor discharge plenum 120 is then supplied to the combustion chamber(s) 106 of the combustor(s) 100 by the fuel nozzle(s) 112 for use in combusting the fuel.

The combustor assembly 100 includes an inner liner 102 extended annularly along the circumferential direction C. The combustor assembly 100 further includes an outer liner 104 positioned outward from the inner liner 102 along the radial direction R. The outer liner 104 is extended annularly along the circumferential direction C. In this respect, the inner and outer liners 102, 104 define a combustion chamber 106 therebetween. Each liner 102, 104 includes a first liner or forward liner segment 108 and a second liner or aft liner segment 110 positioned downstream of the forward liner segment 108 relative to the direction of flow of fluid, such as the flow of the combustion gases 70, through the combustor assembly 100. The combustor assembly 100 includes one or more fuel nozzles 112 extended through a bulkhead assembly 107 providing a wall at an upstream end 121 of the combustion chamber 106. The fuel nozzle 112 supplies a mixture of gaseous and/or liquid fuel and oxidizer, such as air 68, to the combustion chamber 106. The fuel and air mixture burns within the combustion chamber 106 to generate the combustion gases 70. Although FIG. 2 illustrates a single annular combustor assembly 100, the combustion section 34 may, in other embodiments, include a plurality of combustor assemblies 100. Other combustor configurations include can-combustors and can-annular combustors.

In several embodiments, the combustor assembly 100 includes a dilution slot or gap 114 formed by a separation along the longitudinal direction L of the forward liner segment 108 from the aft liner segment 110. The dilution slot or gap 114 is extended at least partially along the circumferential direction C. The forward liner segment 108 is extended from the bulkhead assembly 107 along the longitudinal direction L toward a downstream end 123 of the combustion chamber 106. The aft liner segment 110 is extended from the turbine nozzle 52 along the longitudinal direction L toward the upstream end 121 of the combustion chamber 106.

Figure 3:
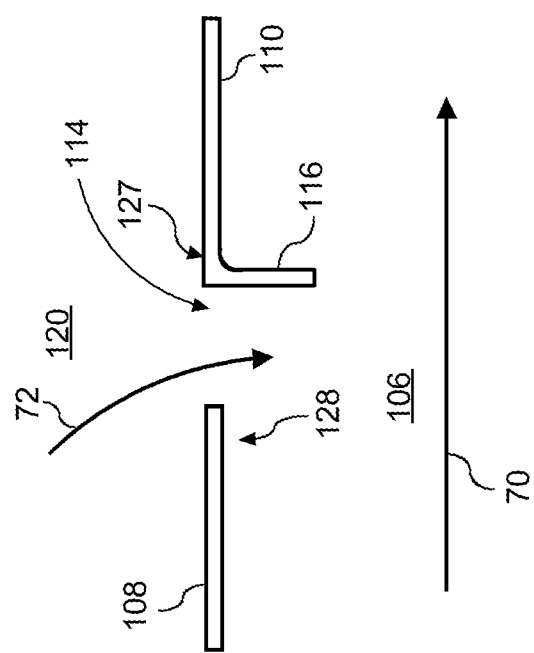
FIG. 3 is a cross-sectional side view of an embodiment of a combustor of the combustion section of the gas turbine engine in accordance with aspects of the present disclosure.
Figure 5:
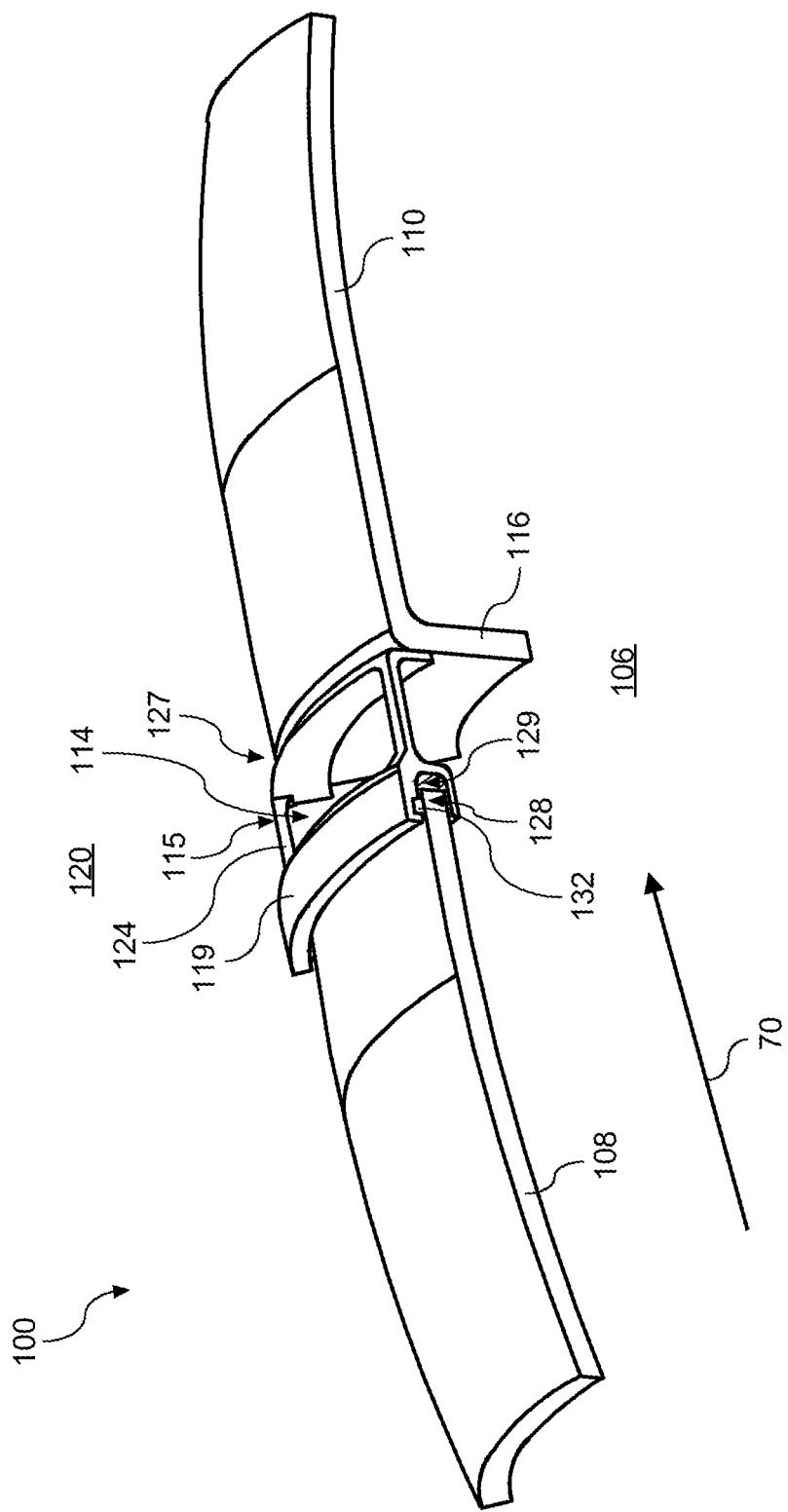
FIG. 5 is a perspective view of a portion of a combustor of the combustion section of the gas turbine engine in accordance with aspects of the present disclosure.
Figure 6:
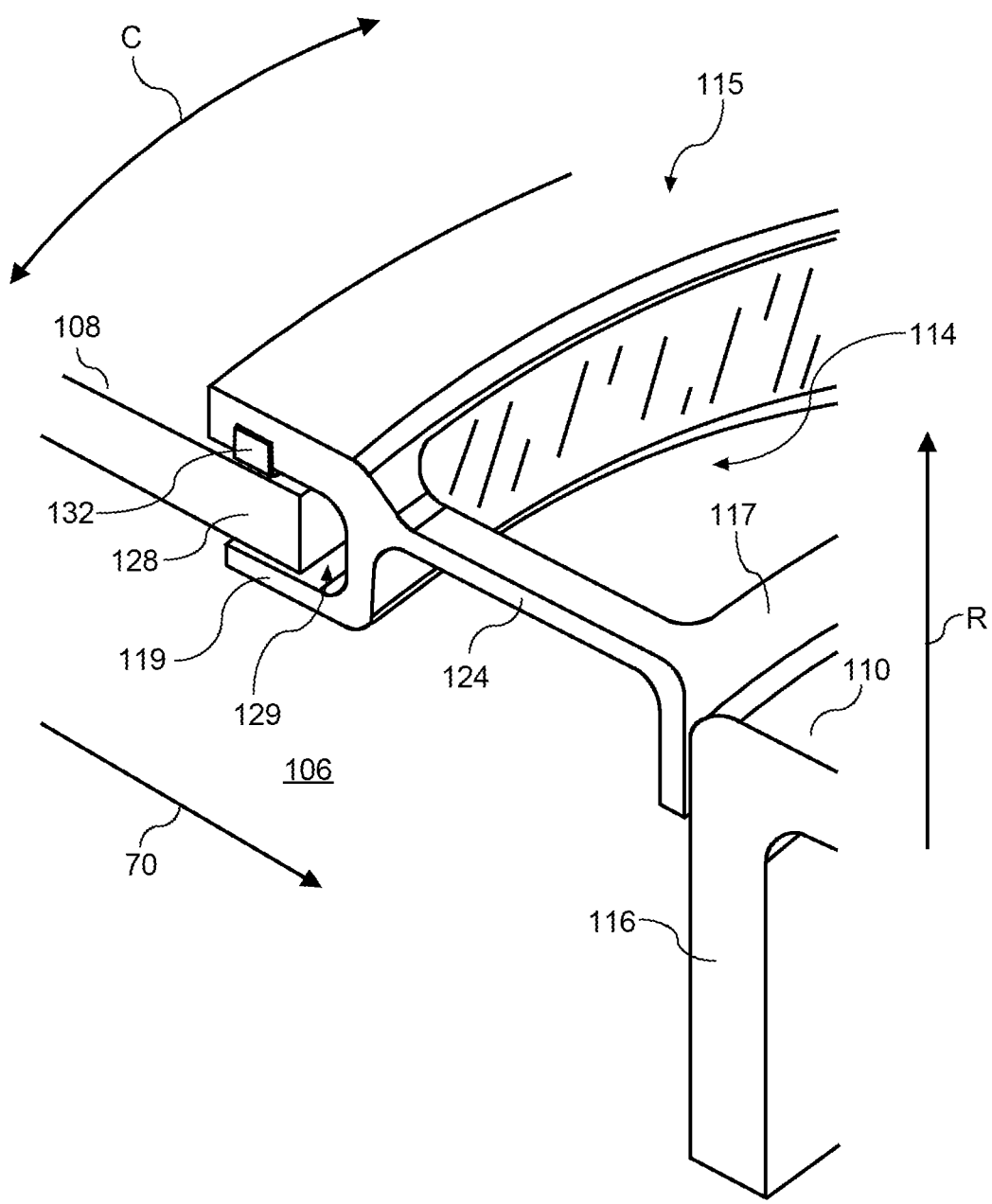
FIG. 6 is a perspective view of an exemplary embodiment of a portion of the combustor of FIG. 5 in accordance with aspects of the present disclosure.
Figure 7:
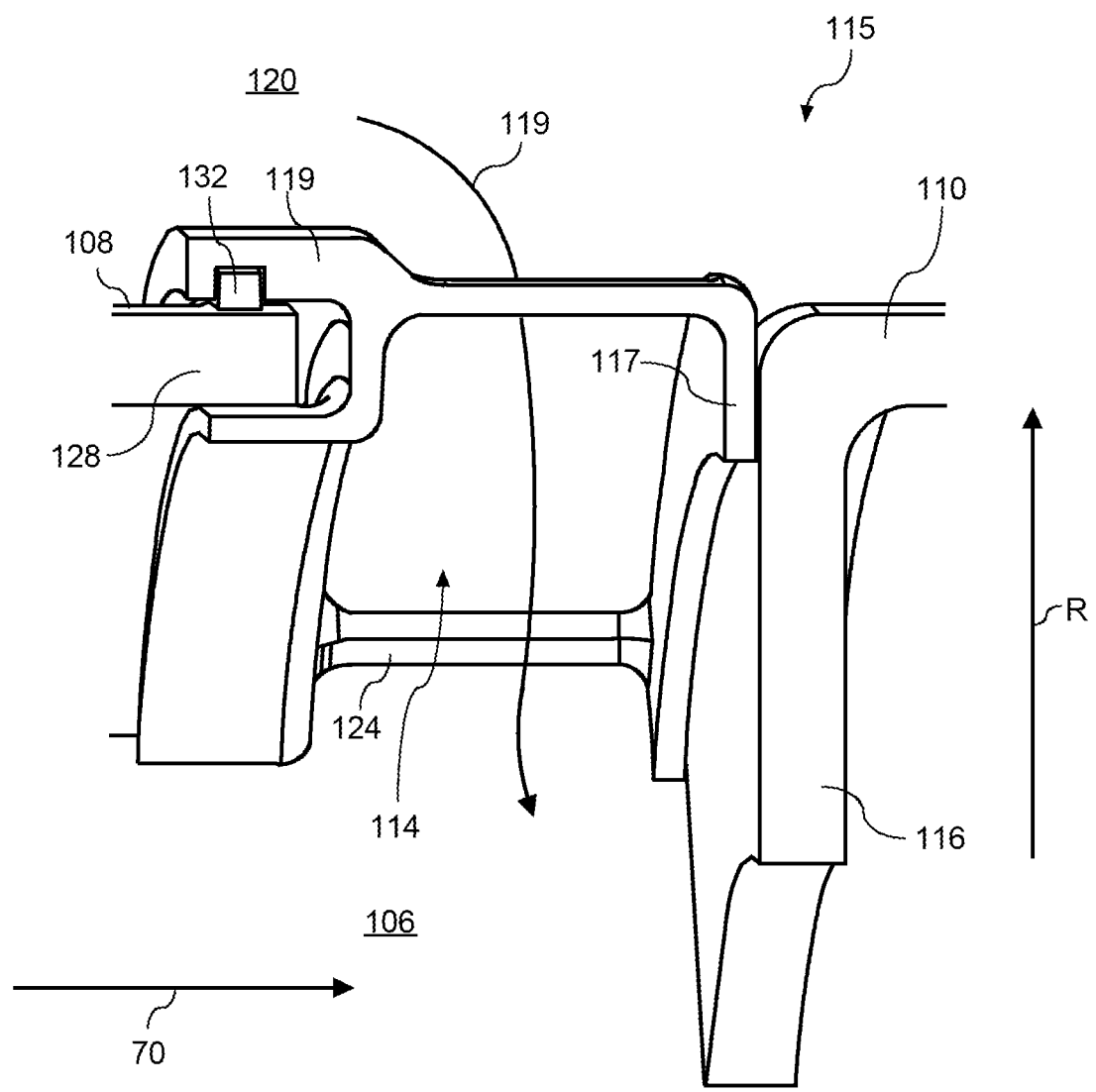
FIG. 7 is a perspective view of an exemplary embodiment of a portion of the combustor of FIG. 5 in accordance with aspects of the present disclosure.

In a particular embodiment, the forward liner segment 108 is cantilevered from the bulkhead assembly 107 and the aft liner segment 110 is cantilevered from the turbine nozzle 52. Referring now to FIGS. 2-3, the dilution slot or gap 114 is positioned between an aft end 128 of the forward liner segment 108 and a forward end 127 of the aft liner segment 110. In certain embodiments, the forward end 127 of the aft liner segment 110 proximate to the dilution slot or gap 114 includes a radially-extended wall or fence 116. The fence 116 is positioned adjacent to the dilution slot or gap 114 and is extended into the combustion chamber 106. The fence 116 may furthermore extend annularly along the circumferential direction C. In certain embodiments, the fence 116 may include a plurality of segmented arcs forming a partially or substantially annular structure.

Referring back to FIG. 2, during operation, a portion of the compressed air, depicted schematically via arrows 71, is routed around the combustor assembly 100 through the compressor discharge plenum 120. At least a portion of the compressed air enters into the combustion chamber 106 through the gap 114, such as depicted schematically via arrows 72. The dilution air 72 entering the combustion chamber 106 through the gap 114 reduces or mitigates the formation of NOR. Furthermore, the fence 116 directs the dilution air 72 along radial direction R toward the center of the combustion chamber 106 and increases the turbulence within the combustion chamber 106, allowing for improved mixing of the dilution air 72 with the combustion gases 70 to mitigate the formation of NOR. It should be appreciated that particular embodiments include the fence 116 extended inward along the radial direction R toward the center of the combustion chamber 106 from the outer liner 104. In still particular embodiments, the fence 116 is extended outward along the radial direction R toward the center of the combustion chamber 106 from the inner liner 102.

Referring now to FIG. 4 through FIG. 16, in various embodiments, the combustor assembly 100 includes a moveable interface 115 abutting the aft liner segment 110 at the forward end 127. The moveable interface surrounds the aft end 128 of the forward liner segment 108. In certain embodiments, such as further described herein, the moveable interface 115 is coupled to the aft end 128 of the forward liner segment 108. In a particular embodiment, the moveable interface 115 is detachably coupled to the forward end 127 of the aft liner segment 110. However, it should be appreciated that a head end 117 of the moveable interface 115 may be brazed, welded, or otherwise mated to the aft liner segment 110.

The moveable interface 115 includes the head end 117 proximate to the forward end 127 of the aft liner segment 110. The moveable interface 115 includes a fork end 119 proximate to the aft end 128 of the forward liner segment 108. The fork end 119 is proximate to the aft end 128 of the forward liner segment 108 relative to the head end 117 that is distal to the fork end 119 and proximate to the forward end 127 of the aft liner segment 110. The head end 117 forms a terminal end configured to abut the forward end 127 of the aft liner segment 110 along the longitudinal direction L. The fork end 119 branches into one or more longitudinally-extended segments at least partially surrounding the aft end 128 of the forward liner segment 108. The fork end 119 forms a cavity 129 at which the aft end 128 of the forward liner segment 108 is positioned.

In certain embodiments, the fork end 119 and the head end 117 are connected by a member 124 extended along the longitudinal direction L. The moveable interface 115 may include two or more members 124 extended across the gap 114. Each member 124 is separated along the circumferential direction C, such as to separate the substantially annular dilution slot or gaps 114 into arcuate sections. Each arcuate section of dilution slot or gap 114 is extended between 2 degrees and 178 degrees along the circumferential direction C. In various embodiments, the moveable interface 115 forms a plurality of arcuate sections forming a substantially annular or 360 degree gap 114. It should be appreciated that the substantially annular gap 114 including the members 124 may form up to 359 degrees of space or opening, or at least 345 degrees of opening between the liners 108, 110.

Figure 4:
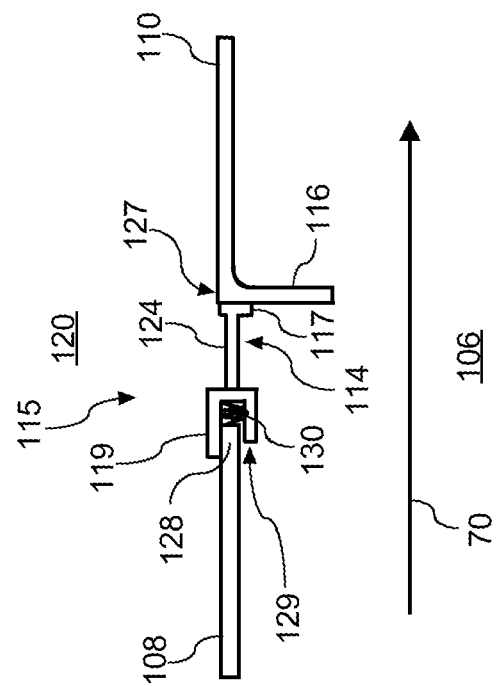
FIG. 4 is a cross-sectional side view of an embodiment of a combustor of the combustion section of the gas turbine engine in accordance with aspects of the present disclosure.

In certain embodiment, such as depicted in FIG. 4, a spring 130 is positioned in the cavity 129. The moveable interface 115 is coupled to the aft end 128 of the forward liner segment 108 via the spring 130. In various embodiments, the spring 130 is extended along the longitudinal direction L (FIG. 2) or substantially co-directional to the flow of combustion gases 70 through the combustion chamber 106 from the forward liner segment 108 toward the aft liner segment 110. The spring 130 is configured to push the moveable interface 115 along the longitudinal direction L toward the aft liner segment 110. As such, the spring 130 may allow the moveable interface 115 to expand, contract, or otherwise move along the longitudinal direction L, such as to allow for movement based on changes in temperature, or differences in temperature between components, such as the forward liner segment 108 and the aft liner segment 110. The spring 130 may prevent undesired stresses and fatigue associated with thermal cycling and thermal gradients across the combustor assembly 100. Furthermore, the spring 130 may allow the moveable interface 115 to adjust or control the gap 114 relative to changes in liner temperature, or changes in a difference between temperatures at the forward liner segment 108 and the aft liner segment 110. The spring 130 may further provide improved vibration response or dampening.

In various embodiments, the spring 130 is extended circumferentially within the cavity 129. The spring 130 may form a single annular piece, or include a plurality of segments or arcs. The spring 130 may further form a seal at the cavity 129 mitigating flow through the cavity 129 between the compressor discharge plenum 120 and the combustion chamber 106.

In certain embodiments, such as depicted in FIGS. 5-10, the combustor assembly 100 additionally, or alternatively, includes a seal 132 positioned in the cavity 129 to mitigate flow through the cavity 129 between the compressor discharge plenum 120 and the combustion chamber 106. The seal 132 may include a single annular piece extended circumferentially through the cavity 129. In other embodiments, the seal may include a plurality of segments or arcs in circumferentially adjacent arrangement. The seal may include a rope seal, a piston ring, a spring (e.g., an annular member detached at a terminal end), a gasket, or other appropriate sealing device. In a particular embodiment, the moveable interface 115 is coupled to the forward liner segment 108 via the seal 132. In certain embodiments, the forward liner segment 108 attaches to the moveable interface 115 via the seal 132 and/or the spring 130. The seal 132 may extend annularly along the forward liner segment 108. In a still particular embodiment, the seal 132 is coupled to a cold side of the forward liner segment 108, such as the face proximate to the compressor discharge plenum 120 and distal to the combustion chamber 106.

Figure 8:
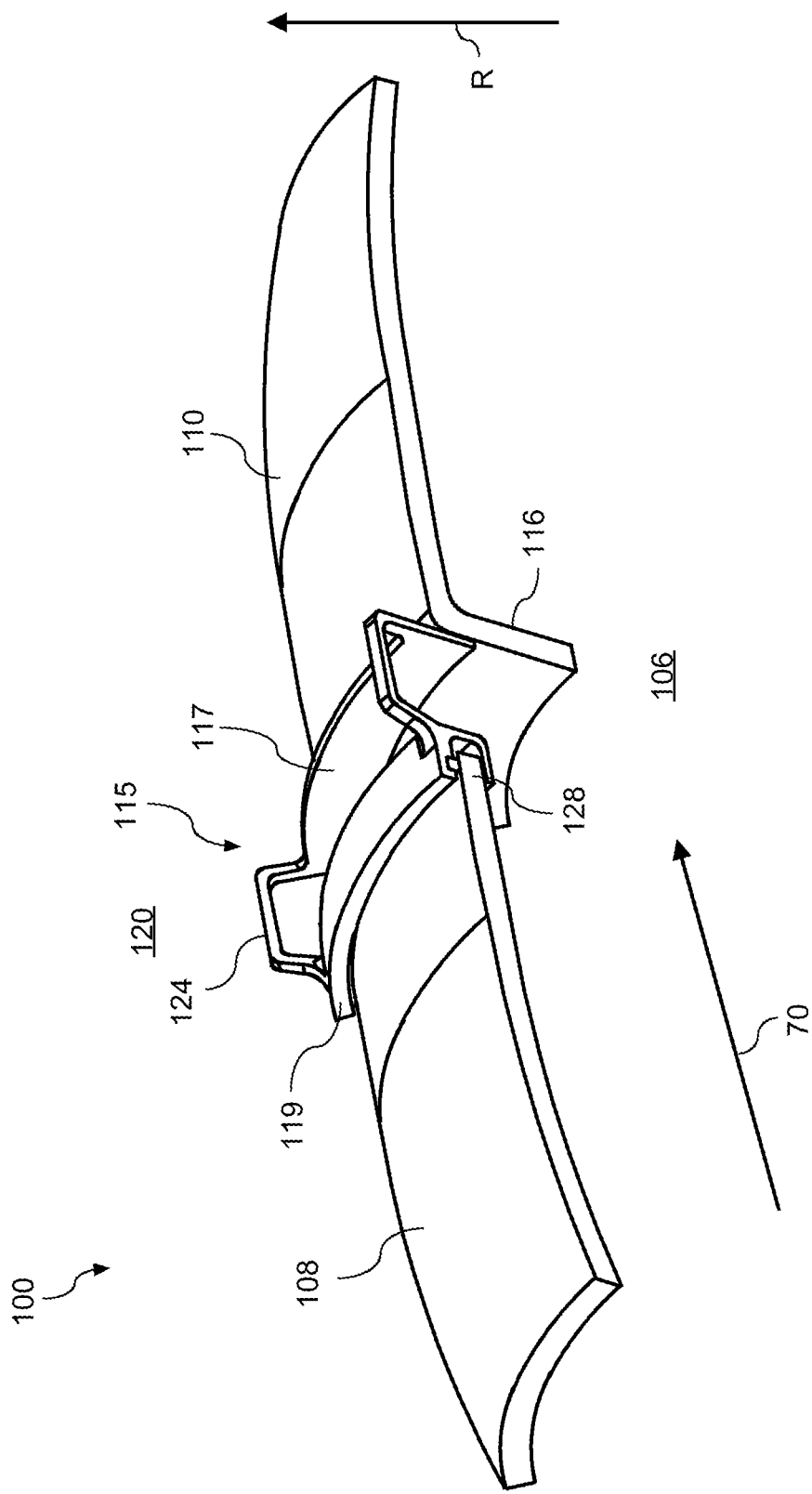
FIG. 8 is a perspective view of an exemplary embodiment of a combustor of the gas turbine engine in accordance with aspects of the present disclosure.
Figure 9:
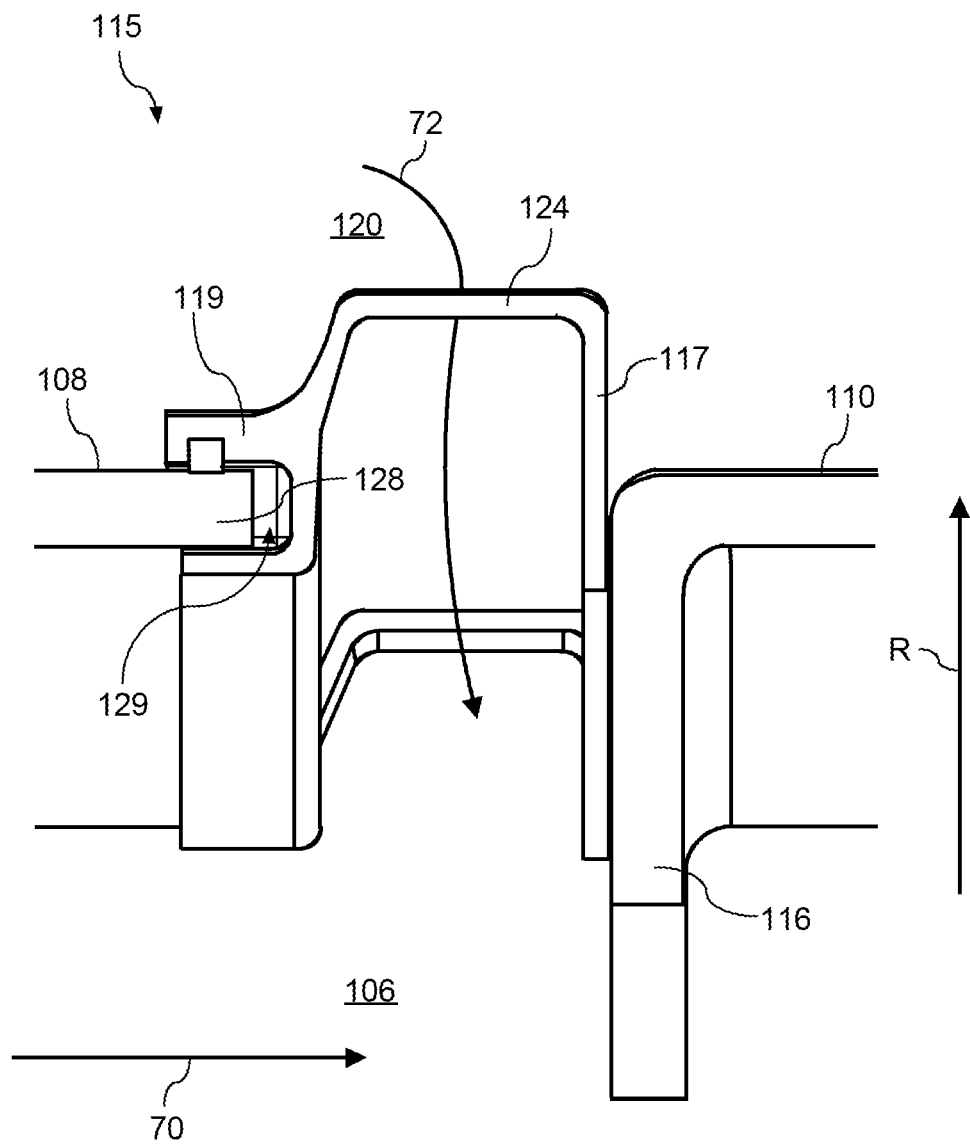
FIG. 9 is a perspective view of an exemplary embodiment of a portion of the combustor of FIG. 8 in accordance with aspects of the present disclosure.
Figure 10:
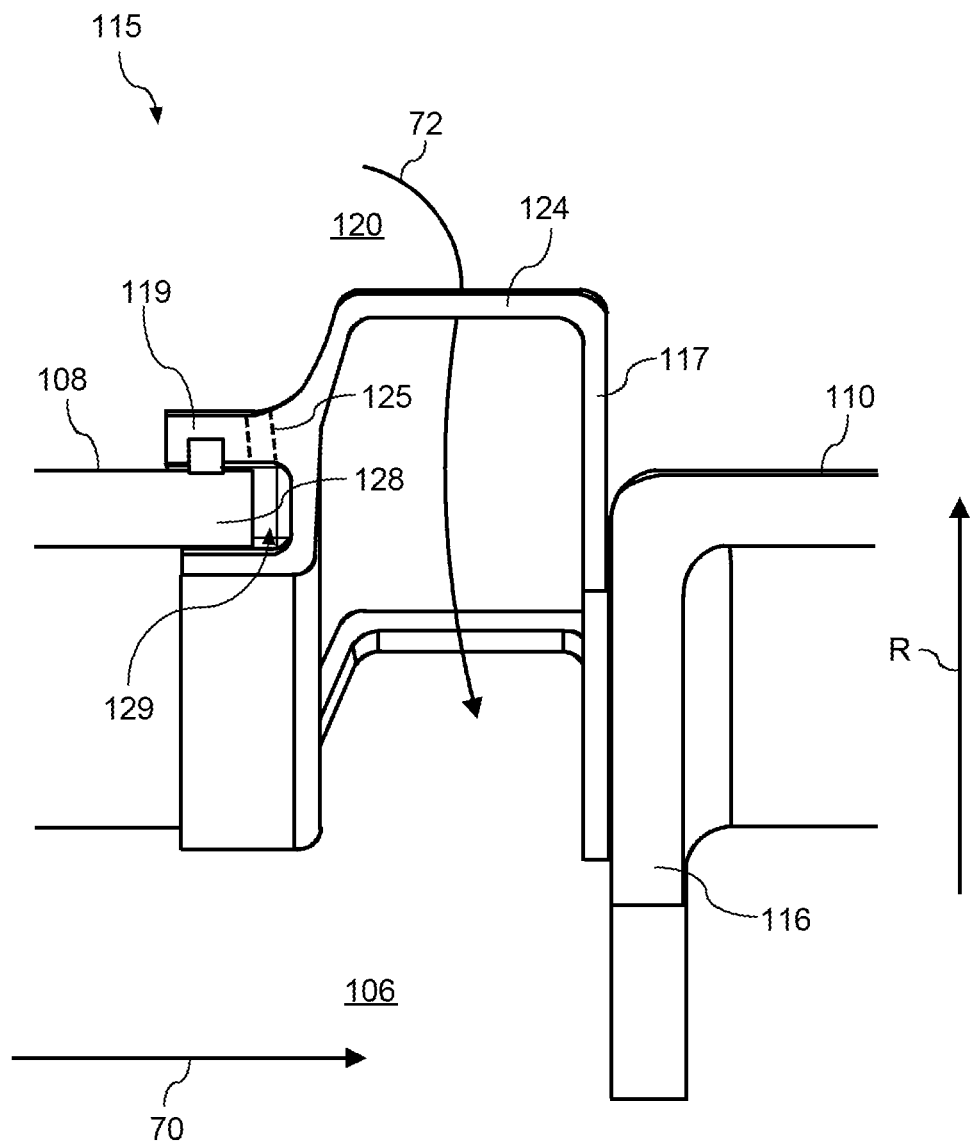
FIG. 10 is a perspective view of an exemplary embodiment of a portion of the combustor of FIG. 8 in accordance with aspects of the present disclosure.

Referring still to FIGS. 5-10, in various embodiments, the head end 117 of the moveable interface 115 is extended along the radial direction R. The head end 117 may particularly extend alongside the fence 116. In certain embodiments, such as depicted in FIGS. 8-10, the head end 117 is extended outward along the radial direction R. In certain embodiments, the head end 117 is extended annularly along the circumferential direction C. The members 124 are connected to the head end 117 and raised above the gap 114. The members 124 positioned as such may decrease or mitigate aerodynamic interactions of the dilution air 72 relative to the dilution air 72 entering the combustion chamber 106. Stated differently, when the members 124 are positioned further away from the combustion chamber 106, the flow characteristics of the dilution air 72 entering the combustion chamber 106 may be more circumferentially uniform. In still various embodiments, the member 124 may be utilized to desirably alter or condition the flow characteristics of the dilution air 72 when mixing with the combustion gases 70.

Referring briefly to FIG. 10, another exemplary embodiment of the moveable interface 115 is provided. The combustor assembly 100 is configured substantially similarly as depicted and described in regard to FIGS. 1-9. In FIG. 10, the fork end 119 may further form a vent opening 125 providing fluid communication between the compressor discharge plenum 120 and the cavity 129. The vent opening 125 may be formed as a plurality of discrete openings in adjacent arrangement along the circumferential direction C. The vent opening 125 may be a slot extended along an arc or circumferential segment, or as a substantially round orifice, or other suitable opening. The vent opening 125 may allow for a desired amount of cooling fluid through the cavity 129, such as to decrease the temperature within the cavity 129, or at the fork end 119, or other portions of the moveable interface 115 proximate thereto.

Figure 11:
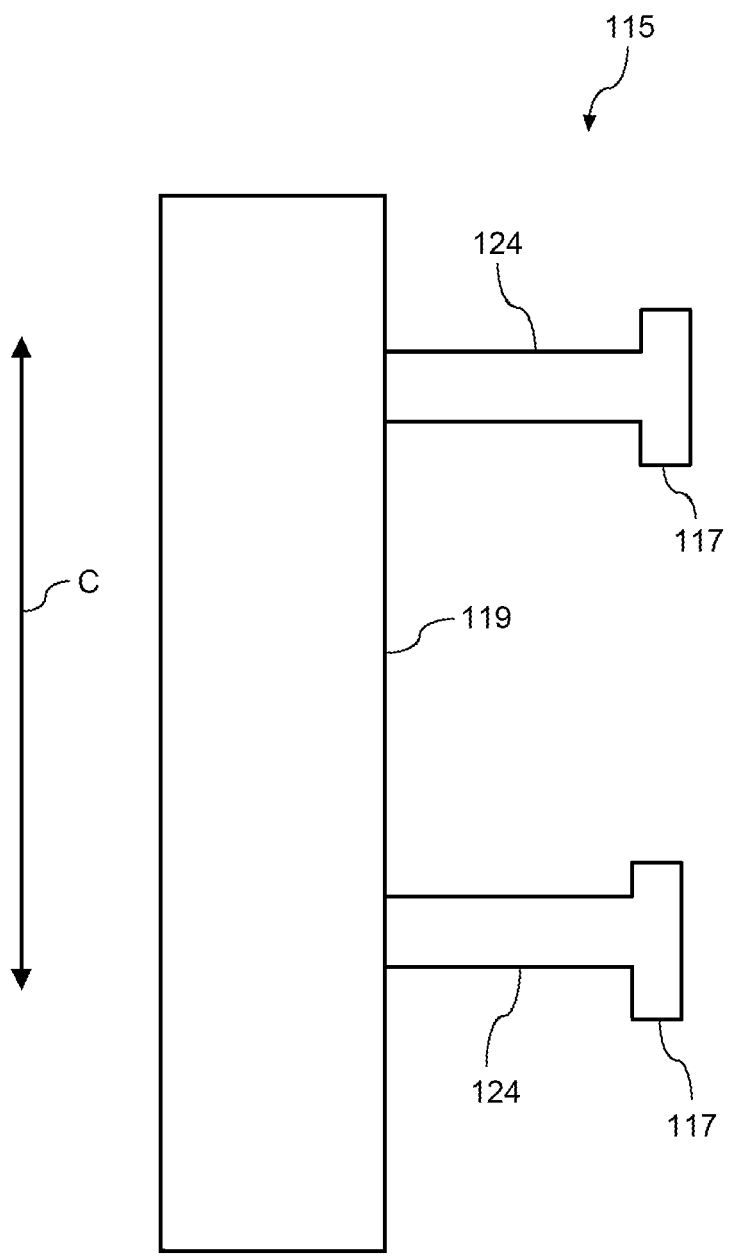
FIGS. 11-16 are schematic embodiments of portions of the combustor of the gas turbine engine in accordance with aspects of the present disclosure.

Referring now to FIGS. 11-16, exemplary embodiments of the moveable interface 115, the forward liner segment 108, and the aft liner segment 110 are provided. The exemplary embodiments provided in regard to FIGS. 11-16 are configured substantially similarly as depicted and described in regard to one or more of FIGS. 2-10. In FIG. 11, the moveable interface 115 includes a plurality of members 124 including the head end 117, in which each head end 117 is separate from one another along the circumferential direction C.

Figure 12:
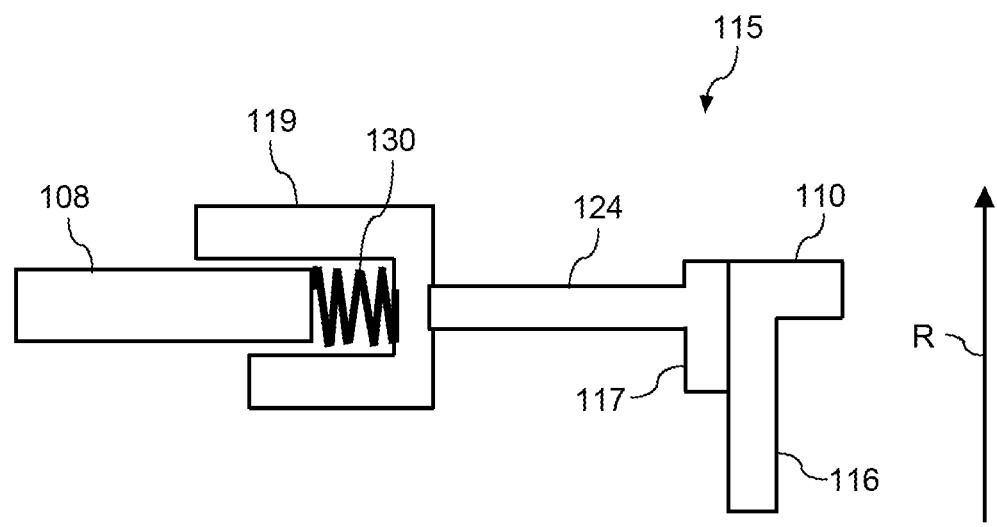
Figure 13:
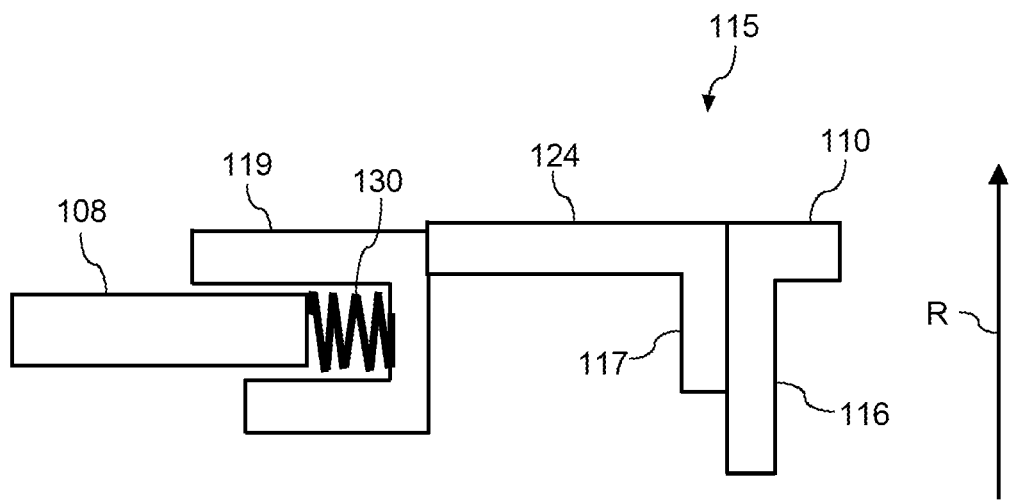

In FIGS. 12-13, the exemplary embodiments provided are configured substantially similarly as depicted and described in regard to one or more of FIGS. 2-10. In FIGS. 12-13, various exemplary geometries of the head end 117 abutting the second liner 110 are provided. In FIG. 12, the head end 117 includes a substantially "T" geometry, at which a portion of the head end 117 is extended inward and outward along the radial direction R. In FIG. 13, the head end 117 is extended inward along the radial direction R and abutting the fence 116. In FIG. 13, the second liner 110 may be offset along the radial direction R from the first liner 108. In a particular embodiment, the second liner 110 is offset outward along the radial direction R from the first liner 108, and the member 124 is connected to a radially outward portion of the fork end 119 to place the first liner 108 relatively radially inward in the within the fork end 119. However, it should be appreciated that other embodiments may offset the second liner 110 inward along the radial direction R from the first liner 108 via the member 124 connected to a radially inward portion of the fork end 119 to place the first liner 108 relatively radially outward within the fork end 119.

Figure 14:
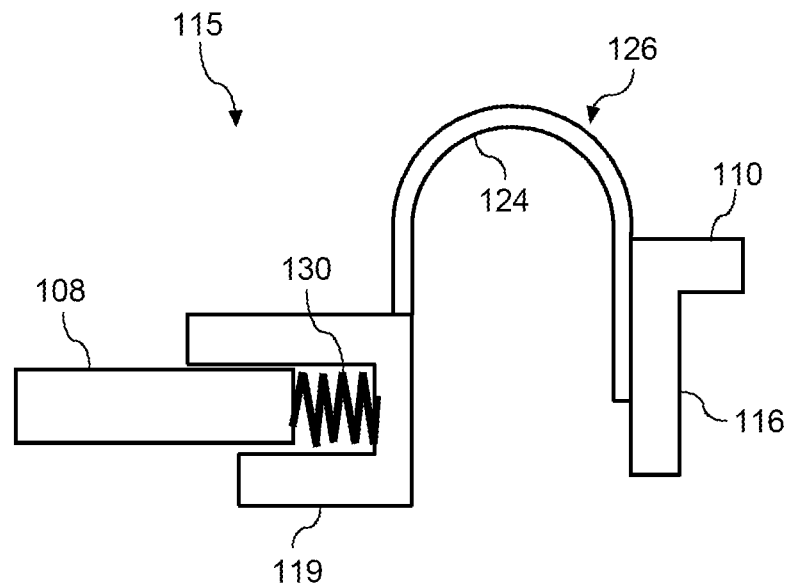
Figure 15:
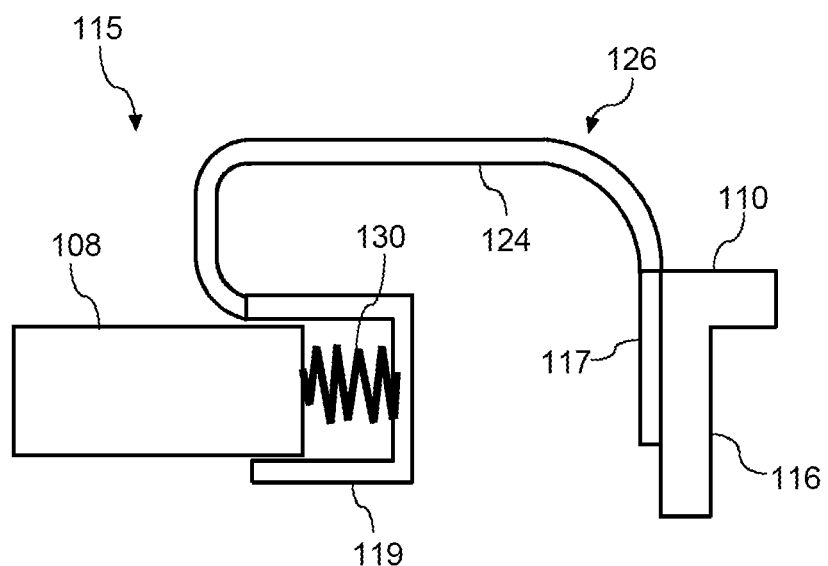

In FIGS. 14-15, the member 124 may further include one or more bends or radii 126, such as to form a spring between the head end 117 of the moveable interface 115 and the fork end 119. In a particular embodiment, the member 124 may include a first material having a first thermal coefficient of expansion different from the head end 117 and/or the fork end 119 having a second material having a second thermal coefficient of expansion. The first thermal coefficient of expansion may be configured to allow for substantially greater change or movement relative to the second coefficient of expansion. Still further, the member 124 having one or more bends or radii 126 may form a spring at the moveable interface 115, such as to allow for controllability or adjustment of the gap 114 and/or improved vibration response and dampening such as described above.

Figure 16:
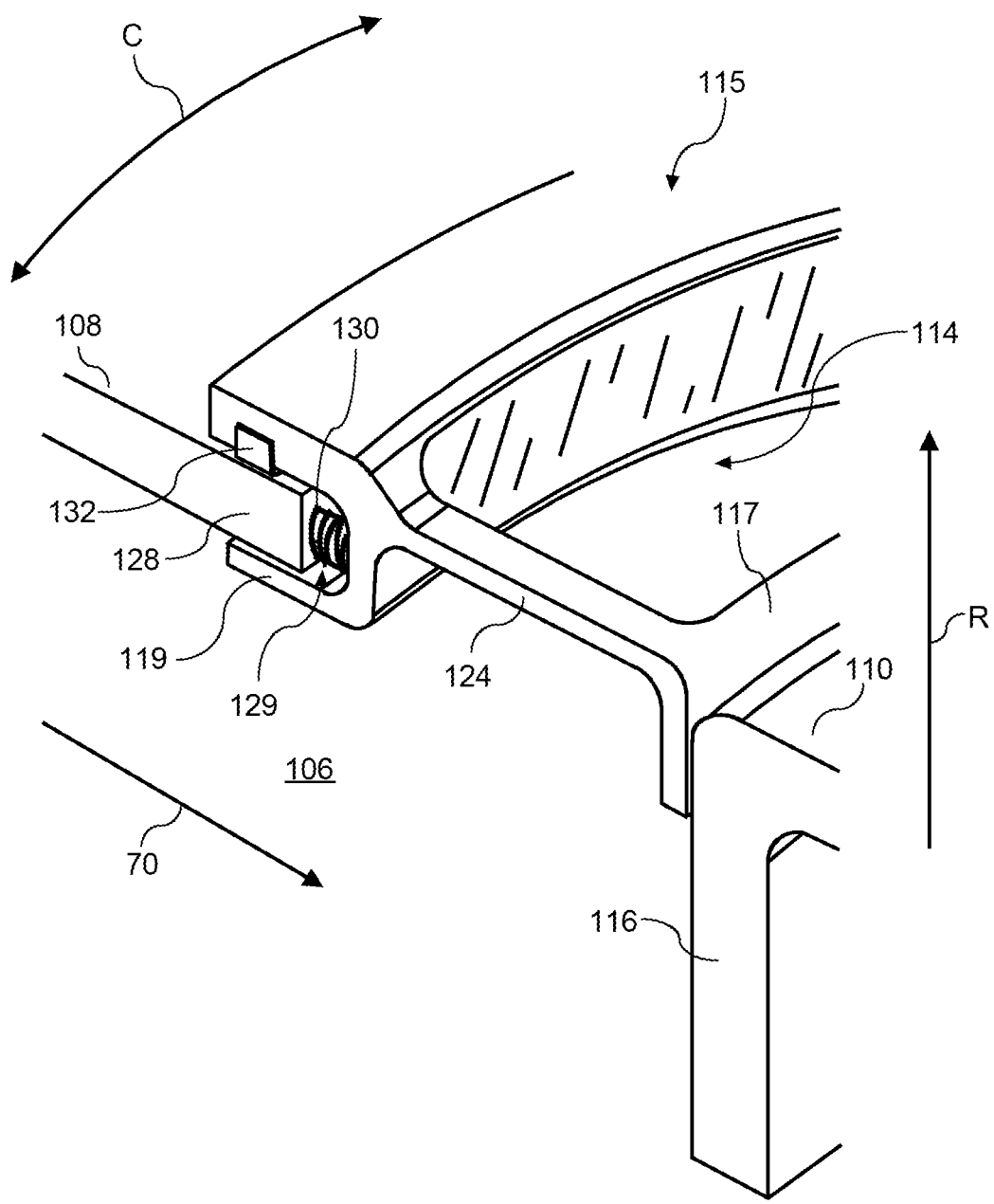

In FIG. 16, a perspective view is provided in which the seal 132 and the spring 130 are each included in the cavity 129, such as described above. The moveable interface 115 may include a plurality of the spring positioned in the cavity 129 at various circumferential portions. The seal 132 may be extended annularly, such as to inhibit flow between the compressor discharge plenum 120 and the cavity 129. In still another embodiment, the moveable interface 115 may include the vent opening 125, such as depicted and described in regard to FIG. 10. The vent opening may allow a controlled or metered flow of fluid into the cavity 129 from the compressor discharge plenum 120. In certain embodiments, the positioning of the vent opening 125 may correspond to a positioning of discrete springs 130, such as to allow for a controlled magnitude of cooling fluid to thermally communicate from the compressor discharge plenum 120 to the spring 130.

The combustor assembly 100 provided herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation), composite materials, metal matrix composites, or ceramic matrix composites (CMC), or combinations thereof, or other materials suitable for high-stress, high-temperature environments. In certain embodiments, the first liner or forward liner segment 108 and the second liner or aft liner segment 110 are each formed from sheet metal, castings, forgings, layups, additive manufacturing processes, or other appropriate manufacturing processes for combustors. The liners and respective components such as described herein may be formed as respective integral portions, or fastened, bonded, or otherwise formed together as may be appropriate for combustors and turbine sections. In still various embodiments, the forward liner segment 108 may include a first material, the aft liner segment 110 may include a second material, and the moveable interface 115 may include a third material, in which each material includes different thermal expansion coefficients from one another. The moveable interface 115 may form a floating insert that regulates or controls a longitudinal dimension of the gap 114 and accommodates the independent thermal expansion of the forward liner segment 108 and the aft liner segment 110.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. A combustor assembly defining a longitudinal direction and a circumferential direction, the combustor assembly comprising a first liner and a second liner together defining at least in part a combustion chamber, wherein the first liner and the second liner are separated by a gap along the longitudinal direction, and wherein the first liner is forward of the second liner relative to a flow of fluid through the combustion chamber along the longitudinal direction, and wherein the gap is extended along the circumferential direction.

2. The combustor assembly of any one or more clauses herein, wherein the second liner is connected to a turbine nozzle at a downstream end of the combustion chamber, and wherein the first liner is connected to a bulkhead assembly at an upstream end of the combustion chamber.

3. The combustor assembly of any one or more clauses herein, wherein the second liner is cantilevered from the turbine nozzle.

4. The combustor assembly of any one or more clauses herein, wherein the gap is extended annularly along the circumferential direction.

5. The combustor assembly of any one or more clauses herein, the combustor assembly comprising a moveable interface abutting the second liner at a forward end, wherein the moveable interface surrounds an aft end of the first liner.

6. The combustor assembly of any one or more clauses herein, wherein the moveable interface is coupled to the aft end of the first liner.

7. The combustor assembly of any one or more clauses herein, wherein the moveable interface comprises a head end proximate to the forward end of the second liner relative to a fork end, and wherein the fork end is proximate to the aft end of the first liner relative to the head end.

8. The combustor assembly of any one or more clauses herein, wherein the aft end of the first liner is positioned in a cavity defined by the fork end of the moveable interface.

9. The combustor assembly of any one or more clauses herein, the combustor assembly comprising a spring positioned in the cavity, wherein the moveable interface is coupled to the aft end of the first liner via the spring.

10. The combustor assembly of any one or more clauses herein, wherein the spring is extended along the longitudinal direction from the first liner toward the second liner.

11. The combustor assembly of any one or more clauses herein, wherein the spring is configured to push the moveable interface along the longitudinal direction toward the second liner.

12. The combustor assembly of any one or more clauses herein, the combustor assembly comprising a seal positioned in the cavity, wherein the moveable interface is coupled to the first liner via the seal.

13. The combustor assembly of any one or more clauses herein, wherein the seal is extended annularly along the first liner.

14. The combustor assembly of any one or more clauses herein, wherein the seal is coupled to a cold side of the first liner.

15. The combustor assembly of any one or more clauses herein, wherein the moveable interface comprises a member extended along the longitudinal direction, wherein the member comprises a head end proximate to the forward end of the second liner, and wherein the member comprises a fork end proximate to the aft end of the first liner.

16. The combustor assembly of any one or more clauses herein, wherein the moveable interface comprises two or more members.

17. The combustor assembly of any one or more clauses herein, wherein the first liner and the second liner are each extended annularly, and wherein the member forms the gap as an arcuate section, wherein the arcuate section is extended between 2 degrees and 178 degrees along the circumferential direction.

18. The combustor assembly of any one or more clauses herein, wherein the first liner, the second liner, and the moveable interface are separable from one another.

19. The combustor assembly of any one or more clauses herein, wherein the moveable interface forms an opening providing fluid communication between the cavity and a compressor discharge plenum surrounding the combustor assembly.

20. The combustor assembly of any one or more clauses herein, wherein the moveable interface is extended annularly in the gap between the first liner and the second liner.

21. A gas turbine engine defining a longitudinal direction and a circumferential direction, the gas turbine engine comprising a combustor assembly comprising a first liner and a second liner together defining at least in part a combustion chamber, wherein the first liner and the second liner are separated by a gap along the longitudinal direction, and wherein the first liner is forward of the second liner relative to a flow of fluid through the combustion chamber along the longitudinal direction, and wherein the gap is extended along the circumferential direction, and wherein the combustor assembly comprises a bulkhead assembly at an upstream end of the combustion chamber, wherein the first liner is connected to the bulkhead assembly; and a turbine nozzle at a downstream end of the combustion chamber, wherein the second liner is connected to the turbine nozzle.

22. A gas turbine engine comprising the combustor assembly of any one or more clauses herein.

What is claimed is:

1. A combustor assembly defining a longitudinal direction and a circumferential direction, the combustor assembly comprising:
   a first liner and a second liner together defining at least in part a combustion chamber, wherein the first liner and the second liner are separated by a gap along the longitudinal direction, and wherein the first liner is forward of the second liner relative to a flow of fluid through the combustion chamber along the longitudinal direction, and wherein the gap is extended along the circumferential direction;
   a moveable interface comprising a fork end defining a cavity and a head end, wherein the aft end of the first liner is positioned in the cavity; and
   a spring positioned in the cavity, wherein the moveable interface is coupled to the aft end of the first liner via the spring.

2. The combustor assembly of claim 1, wherein the second liner is connected to a turbine nozzle at a downstream end of the combustion chamber, and wherein the first liner is connected to a bulkhead assembly at an upstream end of the combustion chamber.

3. The combustor assembly of claim 2, wherein the second liner is cantilevered from the turbine nozzle.

4. The combustor assembly of claim 1, wherein the gap is extended annularly along the circumferential direction.

5. The combustor assembly of claim 1, wherein the moveable interface abuts the second liner at a forward end of the second liner.

6. The combustor assembly of claim 5, wherein the head end is positioned proximate to the forward end of the second liner relative to the fork end of the moveable interface, and wherein the fork end is proximate to the aft end of the first liner relative to the head end.

7. The combustor assembly of claim 5, wherein the moveable interface forms an opening providing fluid communication between a cavity and a compressor discharge plenum surrounding the combustor assembly.

8. The combustor assembly of claim 5, wherein the moveable interface is extended annularly in the gap between the first liner and the second liner.

9. The combustor assembly of claim 5, wherein the moveable interface comprises a member extended along the longitudinal direction, wherein the member comprises a head end proximate to the forward end of the second liner, and wherein the member comprises a fork end proximate to the aft end of the first liner.

10. The combustor assembly of claim 9, wherein the moveable interface comprises two or more members.

11. The combustor assembly of claim 9, wherein the first liner and the second liner are each extended annularly, and wherein the member forms the gap as an arcuate section, wherein the arcuate section is extended between 2 degrees and 178 degrees along the circumferential direction.

12. The combustor assembly of claim 1, wherein the spring is extended along the longitudinal direction from the first liner toward the second liner.

13. The combustor assembly of claim 1, wherein the spring is configured to push the moveable interface along the longitudinal direction toward the second liner.

14. The combustor assembly of claim 1, the combustor assembly comprising:
 a seal positioned in the cavity, wherein the moveable interface is further coupled to the first liner via the seal.

15. The combustor assembly of claim 14, wherein the seal is extended annularly along the first liner.

16. The combustor assembly of claim 14, wherein the seal is coupled to a cold side of the first liner.

17. A gas turbine engine defining a longitudinal direction and a circumferential direction, the gas turbine engine comprising:

a combustor assembly comprising a first liner and a second liner together defining at least in part a combustion chamber, wherein the first liner and the second liner are separated by a gap along the longitudinal direction, and wherein the first liner is forward of the second liner relative to a flow of fluid through the combustion chamber along the longitudinal direction, and wherein the gap is extended along the circumferential direction, and wherein the combustor assembly comprises a bulkhead assembly at an upstream end of the combustion chamber, wherein the first liner is connected to the bulkhead assembly, the combustor assembly further comprising a moveable interface comprising a fork end defining a cavity and a head end, wherein an aft end of the first liner is positioned in the cavity; and a spring positioned in the cavity, wherein the moveable interface is coupled to the aft end of the first liner via the spring; and a turbine nozzle at a downstream end of the combustion chamber, wherein the second liner is connected to the turbine nozzle.

* * * * *